United States Patent [19]

Bohländer et al.

[11] 4,453,083

[45] Jun. 5, 1984

[54] APPARATUS FOR THE DETERMINATION OF THE POSITION OF A SURFACE

[75] Inventors: Peter Bohländer, Dusseldorf; Heinz-Peter Hippler, Dortmund-Dorstfeld, both of Fed. Rep. of Germany

[73] Assignee: Betriebsforschungsinstitut VDEh Institut fur angewandte Forschung GmbH, Dusseldorf, Fed. Rep. of Germany

[21] Appl. No.: 315,039

[22] Filed: Oct. 26, 1981

[51] Int. Cl.³ .................................................. G01C 3/08
[52] U.S. Cl. ...................................... 250/561; 250/577; 73/293; 354/4
[58] Field of Search ............... 250/577, 578, 560, 561; 356/373, 375, 376, 381; 156/601; 73/293; 354/1, 4

[56] References Cited

U.S. PATENT DOCUMENTS

| | | | |
|---|---|---|---|
| 3,882,319 | 5/1975 | Clement et al. | 250/577 |
| 4,247,784 | 1/1981 | Henry | 250/577 |
| 4,282,184 | 8/1981 | Fiegl et al. | 156/601 X |

OTHER PUBLICATIONS

Kern, "Laser Sensing Apparatus", IBM Technical Disclosure Bulletin, vol. 19, No. 8, pp. 2971–2972, Jan. 1977.

*Primary Examiner*—David C. Nelms
*Assistant Examiner*—Edward P. Westin
*Attorney, Agent, or Firm*—Holman & Stern

[57] ABSTRACT

Apparatus is disclosed for determining the position of a surface in which radiation from an optical radiant source is applied to the surface and, by means of a lens system, an image of the radiation is produced on a photoelectric receiver. A laser serves as the radiant source, and is aimed at an angle of inclination relative to an optical axis of the lens system at a point of a surface which, by virtue of its temperature, emits visible radiation in the same wavelength range as the Laser. The surface extends approximately perpendicularly of the optical axis and is subject to positional variations along the said optical axis. The beam is directed from the irradiated point to the photoelectric receiver through a narrow-band optical filter of which the pass band includes the laser wavelength.

6 Claims, 1 Drawing Figure

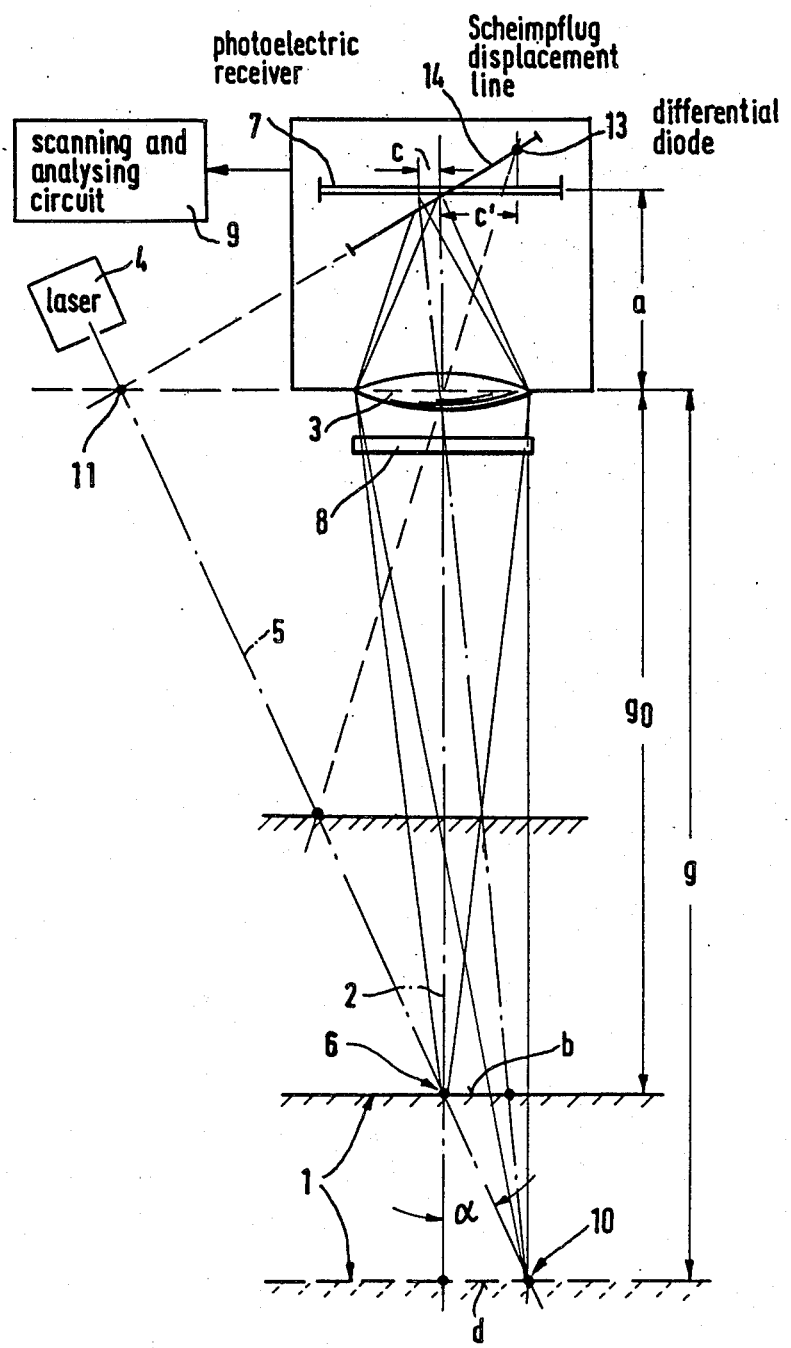

APPARATUS FOR THE DETERMINATION OF THE POSITION OF A SURFACE

BACKGROUND OF THE INVENTION

1. Technical Field

The invention relates to a method of determining the position of a surface. More particularly, the invention relates to making such determination in a system of the type wherein a light beam is directed toward the surface and and image of the beam is detected through a lens arrangement. The invention further relates to apparatus for implementing the said method.

2. Discussion of the Prior Art

A method of the kind specified is known from German OS No. 21 40 939, according to which a body is placed into the parallel raypath or beam of a lens in the focal point of which a light source is arranged. The outside diameter of this lens is greater than the diameter of the body to be tested so that the body surface in every case forms a shadow within the parallel ray beam. The rays which remain unobstructed on either side of this radiation shadow impinge, for example, on a photodiode line scanning camera with about 1000 photoelements. In this manner one can ascertain the diameter of the body as well as its position within the beam. At any rate, positional deviations of the body in a vertical or perpendicular direction relative to the direction of propagation of the parallel rays are ascertained by this method. By contrast, positional deviations of the body, and thus of its surface, are not detected if such positional deviations occur in the direction of propagation of the beam. Furthermore it is a prerequisite condition for the known method that the surface of the body must be fully irradiated and that, over and above this, the rays of the beam must be unobstructed on either side of the surface.

OBJECTS AND SUMMARY OF THE INVENTION

Against this background, the basic aim of the present invention resides in developing the said method further in by making it also applicable to surfaces which have a larger spatial extension than the cross section of the beam, and which vary their position in the direction of beam propagation. such behaviour occurs particularly with the surfaces of molten metals, such as, for example, molten steel, where it is necessary to monitor the level of the melt in a ladle, in a distributor vessel or in a continuous casting mould. Normally the filling or content of a ladle is ascertained by weight determination, the filling of a distributor vessel by visual check and the filling of a continuous casting mould by radioactivity; however, the first two mentioned methods are relatively inaccurate and unfit for automation whilst the third method constitutes a helath risk because of radiation exposure. Optical methods which are based on the formation of an image of the surface, on the other hand, have hitherto not been able to find widespread application.

According to the method of this invention the stated aim is achieved by the provisions proposed in the claims.

Specifically, simultaneous application of a laser and a narrow bandpass optical filter tuned to the laser frequency permits taking into account not only the geometrical conditions which are basically established by the positional variation of the surface, but also the thermal influences generated by the surface if the surface assumes a high temperature. For in that event, the surface will emit its own radiation which overlaps the reflected radiation of a light spot projected onto the surface so that the light spot can no longer be perceived. However, since at their wavelength laser beams are normally substantially richer in energy than the radiation emitted by a hot industrial surface, such blotting out effect could be avoided at any rate at the wavelength of the laser. There is the disadvantage that photoelectric receivers cannot in this form selectively scan the radiation. However, the narrow-bandpass filter cuts out the closely surrounding thermal radiation to a sufficient extent to make it possible, surprisingly, for the reflected laser beam to be precisely detected even at very high surface temperatures.

This system is all the more effective the narrower the band in which the optical filter confines transmission of the laser frequency or wavelength. The required sharp image focussing can be easily guaranteed with the laser beam thanks to its small amount of divergence. The image forming or focussing lens therefore permits a precise resolution on the photoelectric receiver.

As applied to the determination of the liquid steel melt level in a continuous casting mould, the method benefits from the fact that normally a top layer produced by casting powder floats on the molten metal which still has a lower external temperature than the molten steel itself. However, temperature fluctuations in this layer do not affect the accuracy of the measuring process. Thus, by using a helium-neon laser a satisfactory discrimination of the reflected laser light from surrounding radiation is still obtained, even if the surface temperature has risen up to 1100° C.

Very good results can already be achieved with optical filters having a width at its midpoint of less than 30 nm. With current filters optimum measuring results are obtained at midpoint widths of about 10 nm. Normally lasers with about 5 mW output are adequate. They may still be used at outputs of up to about 1.5 mW, for example in order to allow working without special protective provisions. The already described helium-neon laser enables irradiation with a wavelength of about 632.8 nm, to which wavelength the filter is adapted.

A further, highly interesting facility of discrimination is obtained by modulating the laser beam into alternating or chopped light so that a modulated light signal is received by the photoelectric receiver. In that case the only other thing necessary is the application of the same modulation frequency in the electronic analyser circuit in order thereby to cut out interfering influences due to the surface's own radiation from the area around the irradiated surface point.

The apparatus according to this invention may be executed in two fundamentally different ways. Whereas in the first embodiment of the invention the laser is set and aimed at the surface at a fixed angle which remains constant throughout, this angle can be varied in the other embodiment. This corresponds on the one hand to a diode-line-scanning camera with a corresponding plurality of photodiodes, or with a displaceable differential diode, whilst in the other case a stationary differential diode is provided. Correspondingly, a scanning circuit, or a distance transmission device is needed for the first embodiment whereas the second embodiment requires a transmission link for the setting angle of the laser. Scanning circuits of the kind mentioned are basically known, for example from German OS No. 25 16 756, so that these are not particularly described in the context of the present invention. Transmission links for the transmission or transfer of a setting angle or distance are equally familiar to those skilled in the art.

The interference filter which is used in both embodiments is conveniently arranged closely in front of the lens as viewed in the direction towards the surface which is to be measured. The lens and its distance from the surface may further be so selected, with a view to improved measuring data, that the degree of out of focus or unsharp, blurred image definition of the viewed point is no greater than the resolution of the photoelectric receiver throughout the displacement range of the surface. This prevents the measured data being influenced by unsharp definition which could arise from the fact that the object distance may alter during operation, whereas there is no variability at all for image distance.

For further illustration of the invention, reference is now made to the drawing which relates to an example of execution.

The surface 1, of which the position is to be determined, may be at different distances from the lens 3 along the optical axis 2. Three such positions of surface 1 are indicated in the drawing. The drawing shows the schematically represented laser 4 which, in the given example, is set to include an angle alpha with the optical axis 2. In the middle position the beam 5 of Laser 4 impinges on surface 1 at point 6 which in this case coincides with the point of intersection with optical axis 2. This causes point 6 to be imaged on the photoelectric receiver 7 at the point of intersection between the latter and the optical axis 2. Thus, if the photoelectric receiver 7 is a diode-line scanning camera, the particular photodiode at this point will be illuminated, the bandwidth of incident light being determined by the interference filter 8 in front of the lens 3. A scanning and analysing circuit 9 enables identification of the given position of the image on the photoelectric receiver array 7, thus providing information as to the position of surface 1 for a displacement of incidence point 10 relative to optical axis 2 by the distance d. This displacement corresponds to a displacement of the illuminated diode by a distance c.

In order to use these data for a conclusion concerning the position of surface 1, one assumes a constant fixed image distance a and a known object distance $g_0$. For the measured object distance g, sections d and b must also be taken into account and respectively represent the distances between the intersection points of the optical axis 2 with the two positions of the surface 1 on the one hand and the intersection point of the image beam with the two positions of surface 1 on the other. From this arises the following relation for the evaluation of distance c:

$$c = b \cdot \frac{a}{g_0};$$

$$b = g_0 \cdot \frac{d}{g}$$

$$d = tg\, alpha \cdot (g - g_0)$$

$$c = a \cdot tg\, alpha \left(1 - \frac{g_0}{g}\right)$$

The distance measurement thus related to a predetermined initial distance can be formed by calculation in the evaluating analyser electronics. A similar relation is obtained if one operates with only one differential diode 13 instead of a diode line array camera and has to assume a predetermined fixed value for c whilst introducing the angle alpha as a variable in the quoted relation, or if the photodiode is displaced by the respectively applicable amount of c' and the latter regarded as a variable.

An arrangement particularly designed to enhance clear image definition is obtained if the differential diode 13 is displaced not only vertically relative to the optical axis 2 of the lens 3 but also along a straight line 14, the prolongation of which intersects the intersection point 11 of the laser beam 5 with the main plane 12 of the lens 3. Thus, the path of displacement of the differential diode 13 follows the 'Scheimpflug'-rule and at all times affords maximum image definition.

The straight line 14 may also be used for alignment of the diode line camera 7 and in that case enables maximum image definition also for this camera.

We claim:

1. Apparatus for determining the position of a surface illuminated by a beam from a laser, said apparatus employing an optical lens which has an optical axis and a principal plane to provide an image of the illuminated surface at a photoelectric receiver, said apparatus comprising:
   means for focusing the laser beam on said surface at a constant angle between said surface and said laser beam;
   wherein said photoelectric receiver is a differential diode; and
   means for adjustably positioning said differential diode along a straight line at adjustable distances from said optical axis and said lens, wherein an extension of said straight line passes through an intersection point of said laser beam and said principal plane of said lens.

2. Apparatus according to claim 1 further comprising an interference filter closely spaced in front of the lens as viewed toward said surface.

3. Apparatus according to claim 2 wherein the lens and its distance from said surface are selected such that the amount of said image is out of focus throughout the total range of displacement of the surface is no greater than the resolution of the photoelectric receiver.

4. Apparatus for determining the position of a surface illuminated by a beam from a laser, said apparatus employing an optical lens having an optical axis and a principal plane to provide an image of the illuminated surface at a photoelectric receiver, said apparatus comprising:
   means for focusing the laser beam on said surface at a constant angle between said surface and said laser beam;
   wherein said photoelectric receiver is a diode line scanning camera of which the diode line extends a long a straight line, an extension of which passes through an intersection point of said laser and said principal plane of said lens.

5. Apparatus according to claim 4 further comprising an interference filter closely spaced in front of the lens as viewed towards its surface.

6. Apparatus according to claim 4 wherein the lens and its distance from said surface are selected such that the amount said image is out of focus throughout the total range of displacement of the surface is no greater than the resolution of the photoelectric receiver.

* * * * *